United States Patent

[11] 3,568,150

| [72] | Inventor | John E. Games<br>Granby, Conn. |
|---|---|---|
| [21] | Appl. No. | 816,676 |
| [22] | Filed | Apr. 16, 1969 |
| [45] | Patented | Mar. 2, 1971 |
| [73] | Assignee | United Aircraft Corporation<br>East Hartford, Conn. |

[54] NOISE DISCRIMINATING FAULT APPARATUS
8 Claims, 2 Drawing Figs.

[52] U.S. Cl. .................................................. 340/146.1,
    235/153
[51] Int. Cl. ....................................................... G08b 23/00
[50] Field of Search .......................................... 340/146.1;
    329/104, 107; 235/150.5, 150.51, 153

[56] References Cited
UNITED STATES PATENTS

| 3,138,759 | 6/1964 | Thompson | 329/107UX |
| 3,159,811 | 12/1964 | James et al. | 340/146.1 |
| 3,231,724 | 1/1966 | Andrews | 235/150.51 |

Primary Examiner—Malcolm A. Morrison
Assistant Examiner—R. Stephen Dildine, Jr
Attorney—Melvin Pearson Williams ABSTRACT: Errors sensed in a data handling system are OR'ed into a latch in a data handling system which handles some number of data words (say 200) serially, a scan of all of the words comprising a frame, errors and faults which may occur at any time, in any word, in any frame, may set a fault latch. However, once set, the fault latch is reset only at the end of every 16 frames. The output of the fault latch is signal-averaged, or integrated, in an RC integrating network having a time constant of between ten and twenty times the period of the sixteen frames of words comprising a fault period. By comparing the average output voltage over a long period of time with a standard voltage, indicative of the average voltage equivalent of an error-indicating duty cycle of the fault latch (in contrast with spurious setting as a result of noise signals), an indication of noise-discriminating fault is achieved.

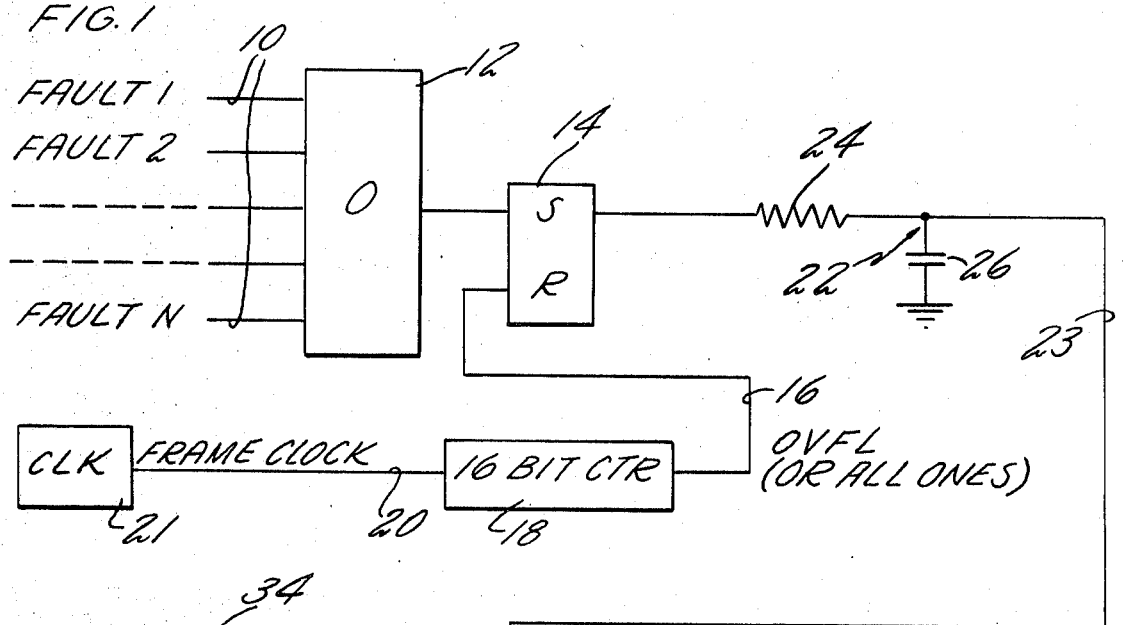
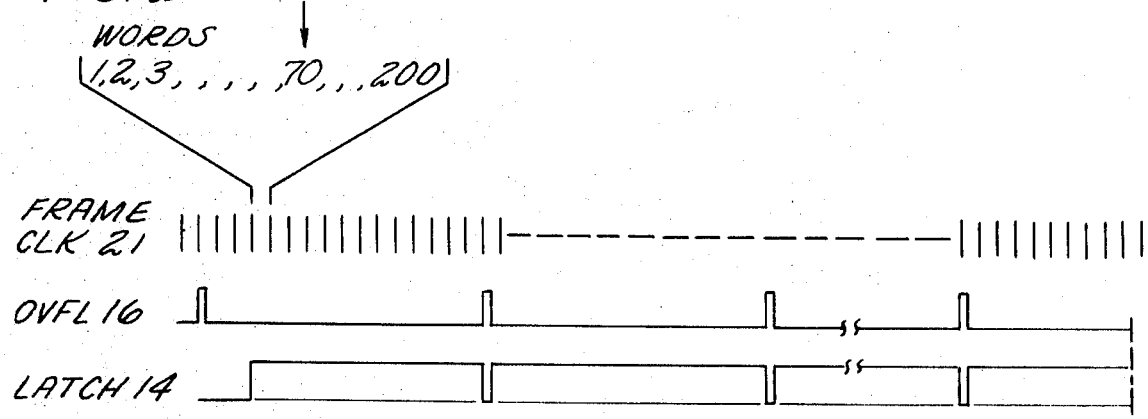

NOISE DISCRIMINATING FAULT APPARATUS

BACKGROUND OF THE INVENTION

1. Field of Invention

This invention relates to data handling, and more particularly to a noise discriminating fault apparatus therefor.

2. Description of the Prior Art

In the prior art, it is known to use various methods for detecting faults in the transmission of data. It has long been known to send data serially a number of times and select the majority result. It has also been known to ignore an error or fault signal if upon a second test of the same condition the error or fault signal has disappeared. However, in highly complex, heavily multiplexed data systems of the type which may be operated (in other than a highly controlled environment), where the apparatus undergoes extremes of temperature, supply voltage, and shock (such as an aircraft), error handling systems known to the prior art are inadequate in many cases.

SUMMARY OF INVENTION

The object of the present invention is to provide a fault detecting system capable of discriminating fault from noise, on a statistical basis, in an adverse data handling environment.

According to the present invention, a fault-settable latch is reset only once for every given number of data frames, all sets of data being monitored at least once in each frame, the average set condition of the fault latch over a period of time being compared against a reference, and fault being recognized only when the duty cycle of the fault latch indicates that it has been on for an amount of time indicative of true faults, rather than a lesser time indicative of setting by spurious noise. In further accord with the present invention, the amount of noise which the fault system will tolerate is adjustable by adjusting a reference to which the duty cycle of the fault latch is compared.

The present invention is particularly suited to adverse data environments, such as data multiplexing systems on an aircraft. The invention permits a statistical comparison between noise and true faults which occur, and further permits adjusting the ratio of on-time to off-time of the fault latch to thereby accommodate greater amounts of spurious noise in the fault system.

Other objects, features and advantages of the present invention will become more apparent in the light of the following description of a preferred embodiment thereof, as illustrated in the accompanying drawings.

BRIEF DESCRIPTION OF THE DRAWING

FIG. 1 is a simplified schematic diagram of a preferred embodiment of the present invention; and FIG. 2 is a simplified timing diagram illustrating the principles of operation of the present invention. DESCRIPTION OF THE PREFERRED EMBODIMENT Referring now to FIG. 1, a plurality of errors or faults 1-N may be manifested by signals on any one of a number of lines 10, each of which may pass through an OR circuit 12 which is operative to set a fault latch 14. The latch 14 may be reset by a signal on a line 16 indicating an overflow, or all-ONES condition, in a 16 bit counter 18. The counter 18 is advanced by a frame clock signal on a line 20 from a clock circuit 21. The output of the latch 14 is passed through a signal averaging circuit or integrator 22 which comprises a resistor 24 and a shunt capacitor 26. The time constant of the integrator 22 is chosen to be equal to about somewhere between 10 and 20 times the fault period, which is the period of time between signals which can appear on the line 16 to reset the latch 14. From the integrator 22, the signal is passed over a line 23 to a voltage comparison circuit 28 which receives another input on a line 29 from an adjustable reference signal means, such as a switch 30 having taps connected to different points along a voltage dividing resistor 32, which in turn is responsive to a standard voltage source 34. The output of the voltage comparison circuit 28 comprises the output of the present invention: a recognized fault signal on a line 36.

Referring briefly to FIG. 2, a frame of data may comprise, in a serial system a number of word times one, two, ... 200. Within each word time a number of bits (together comprising a word) are sent serially over one or more data handling lines. The frame clock signals thus represent demarcations between periods of time within which each of the data sources in the system is capable not only of being transmitted, but also of being monitored for fault so that a fault therein could provide a suitable fault signal on one of the lines 10 (FIG. 1). Anywhere during the 16 frame clock signals between resetting of the latch 14, an error or spurious noise may occur. As far as the 16 frames are involved, it is immaterial to the present invention whether it be an error or spurious noise. Once fault is indicated by a signal on one of the lines 10, the latch 14 is set, and will remain set until the end of the fault period (16 frames). On the other hand, if data is involved, the fault latch 14 will be set during the first frame of the next error period and again remain set throughout the 15 remaining frames of the error period until the fault latch 14 is again reset. As long as error persists in some part of the system, so as to provide a fault signal on one of the lines 10, the latch 14 will continue to be set again, immediately following each reset during the first frame following reset. Thus, the average voltage on line 23 is an indication of the number of fault periods during which the fault latch 14 has been set. Notice that, if an error exists over a span of a number of error periods, the error will cause the fault latch 14 to be set during the first frame of the 16 frame error period; therefore, differences in the average on-time of the fault latch 14 as a result of the particular one of the line 10, and therefore the particular time of the one of the words one, two, three ... 200 which manifested the error or fault that caused the setting of the latch 14 is minimized. By adjusting the selected comparison voltage on line 29 to a suitable level, the voltage comparison circuit 28 will provide a recognized fault signal on the line 36 for a duty cycle of the fault latch 14 which can relate to setting of the fault latch 14 in any number of fault periods, such as two or more. If the circuit were being used in the case where noise was minimal, the comparison voltage on line 29 might be set to equal two consecutive settings of the fault latch 14. On the other hand, if the data line or associated circuitry being checked by the present invention has substantial noise, one may adjust the comparison voltage on line 29 so as to get an output from the voltage comparison circuit 28 only if the average voltage on line 23 is indicative of the fault latch 14 being set in 10 consecutive frames (or any other suitable manner). Since the integrating network 22 is an imperfect integrator (a passive RC network), it will discharge itself over a period of time (say, 10 or 20 frames), it thus automatically restores itself to a zero voltage condition: it automatically resets.

Thus, the embodiment disclosed herein provides for a noise discriminating fault indicator, the noise discrimination characteristic of which is adjustable. In this embodiment, the integrator circuit 22, reference voltage circuitry 30, 32, 34 and voltage comparison circuit 28 comprising means for determining the duty cycle of the fault latch. The invention may also be practiced by comparing the setting of the fault latch 14 with a similar latch which is forced to be set a given number of frames in a row in response to a first setting of the fault latch 14, and a continuous setting of the fault latch 14 for the same number of frames as a comparison latch is being set would result in the generation of a recognized fault signal. Also, a counter could be used to count the number of frames in which the fault latch is set. These forms of the invention are more complex, however. Similarly, although the invention has been shown and described with respect for but one preferred embodiment thereof, it should be obvious to those skilled in the art that the foregoing and various other changes and omissions in the form and detail thereof may be made therein without departing from the spirit and the scope of the invention.

I claim:

1. A noise discriminating fault apparatus comprising:
   a bistable device;
   means responsive to at least one fault-manifesting signal to set said bistable device into a first one of two stable states thereof;
   means for generating clock signals each of which is indicative of a data manifesting period;
   means responsive to said clock signals for setting said bistable device into the other one of its stable states in response to a given number of said clock signals;
   means for presenting a manifestation of the duty cycle of said bistable device; and
   means for generating a recognized fault signal in response to a duty cycle manifestation indicating a duty cycle of said bistable means in excess of a designated or determinable duty cycle.

2. The apparatus according to claim 1 wherein said last named means is adjustable to vary the duty cycle of said bistable means in response to which said recognized fault signal will be generated.

3. The apparatus according to claims 1 wherein said last named means comprises:
   means connected to said bistable device in response to said first state thereof to generate a signal indicative of the average time during which said device is set in said first state;
   means for generating a comparison signal; and
   means comparing said two signals to generate said recognized fault signal.

4. The apparatus according to claim 3 wherein said comparison signal means comprises means to present selected, different standard voltages.

5. The apparatus according to claim 1 wherein said duty cycle means is self-resetting.

6. The apparatus according to claim 5 wherein said duty cycle means comprises an imperfect integrator means.

7. The apparatus according to claim 2 wherein said last named means comprises:
   means connected to said bistable device in response to said first state thereof to generate a signal indicative of the average time during which said device is set in said first state;
   means for generating a comparison signal; and
   means comparing said two signals to generate said recognized fault signal.

8. The apparatus according to claim 7 wherein said comparison signal means comprises means to present selected, different standard voltages.